US012689586B2

(12) United States Patent
Nanduri et al.

(10) Patent No.: US 12,689,586 B2
(45) Date of Patent: Jul. 21, 2026

(54) ROUTE AGGREGATION AS A SERVICE (RaaS)

(71) Applicant: Microsoft Technology Licensing, LLC, Redmond, WA (US)

(72) Inventors: Vishwa Nanduri, Ashburn, VA (US); Pappula Prabhakar Reddy, Johns Creek, GA (US); Samir Jain, Hyderabad (IN); Himanshu Raj, Los Altos, GA (US); Sridharan J, Erode (IN); Snehal Kuber Yadav, Hyderabad (IN); Aniruddha Parkhi, Bothell, WA (US); Umesh Krishnaswamy, San Jose, CA (US); Paul David Mattes, St. Paul, MN (US); Francesco De Paolis, San Jose, CA (US); Zahira Nasrin, Newark, CA (US); Alap Mehta, Redmond, WA (US); Annam Srinivas, Hyderabad (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 234 days.

(21) Appl. No.: 18/645,204

(22) Filed: Apr. 24, 2024

(65) Prior Publication Data

US 2025/0337685 A1     Oct. 30, 2025

(51) Int. Cl.
| | |
|---|---|
| *H04L 45/748* | (2022.01) |
| *H04L 45/036* | (2022.01) |
| *H04L 45/28* | (2022.01) |

(52) U.S. Cl.
CPC .......... *H04L 45/748* (2013.01); *H04L 45/036* (2022.05); *H04L 45/28* (2013.01)

(58) Field of Classification Search
None
See application file for complete search history.

(56) References Cited

U.S. PATENT DOCUMENTS

| | | | | |
|---|---|---|---|---|
| 8,625,420 B2 * | 1/2014 | Shah | .................. | H04L 41/0866 370/230 |
| 10,999,182 B2 * | 5/2021 | Kaplan | .................. | H04L 45/04 |

(Continued)

FOREIGN PATENT DOCUMENTS

| | | | | |
|---|---|---|---|---|
| BR | 112019003145 B1 * | 6/2025 | | |
| CN | 119109849 A * | 12/2024 | ......... | H04L 61/5007 |
| CN | 120238493 A * | 7/2025 | ............. | H04L 45/54 |

OTHER PUBLICATIONS

Extended European Search Report Received in European Patent Application No. 25170889.7 mailed on Sep. 1, 2025, 12 pages.

(Continued)

*Primary Examiner* — Jeffrey R Swearingen
(74) *Attorney, Agent, or Firm* — Foley IP Law, PLLC

(57) ABSTRACT

Example solutions for providing route aggregation as a service (RaaS) are disclosed. A RaaS server receives original routing tables from routers in a wide area network (WAN), aggregates the routes by identifying common prefixes, and returns more compact aggregated routing tables to the routers. The routers use the aggregated routing tables to efficiently route data traffic in the WAN. Multiple resiliency approaches are disclosed, in order to prevent the routers from flushing the aggregated routes in the event that the RaaS server experiences an outage and the border gateway protocol (BGP) session between each router and the RaaS server is lost. Example resiliency measures includes the use of a long lived stale time (LLST), reaching a length of perhaps weeks, during which the routers continue to use the aggregated routing tables, and the use of mirroring the aggregated routing tables in other RaaS.

20 Claims, 7 Drawing Sheets

(56)                    References Cited

U.S. PATENT DOCUMENTS

| | | | |
|---|---|---|---|
| 2004/0039840 A1* | 2/2004 | Dispensa | H04L 45/586 |
| | | | 709/242 |
| 2010/0208744 A1* | 8/2010 | Shaikh | H04L 45/42 |
| | | | 370/408 |
| 2024/0039827 A1 | 2/2024 | Kaplan | |
| 2024/0259312 A1* | 8/2024 | Lyer | H04L 45/748 |

OTHER PUBLICATIONS

Karpilovsky, et al., "Practical Network-Wide Compression of IP Routing Tables", IEEE Transactions on Network and Service Management, vol. 09, Issue No. 04, Dec. 10, 2012, pp. 446-458.

Teruhi, et al., "End-node-based congestion-aware network load balancing", 2004 IEEE International Conference on Communications, Jun. 2004, pp. 2174-2178.

"Welcome to the IETF Community Wiki", Retrieved from: https://wiki.ietf.org/, Jun. 2024, 2 Pages.

"Welcome to the Internet-Draft authors resource site", Retrieved from: https://authors.ietf.org/#section-9.2.2.2, Jun. 2024, 2 Pages.

Rekhter, Y. et al., "A Border Gateway Protocol 4 (BGP-4)", Retrieved from: https://datatracker.ietf.org/doc/html/rfc4271, Jan. 2006, 104 Pages.

\* cited by examiner

Figure 2:
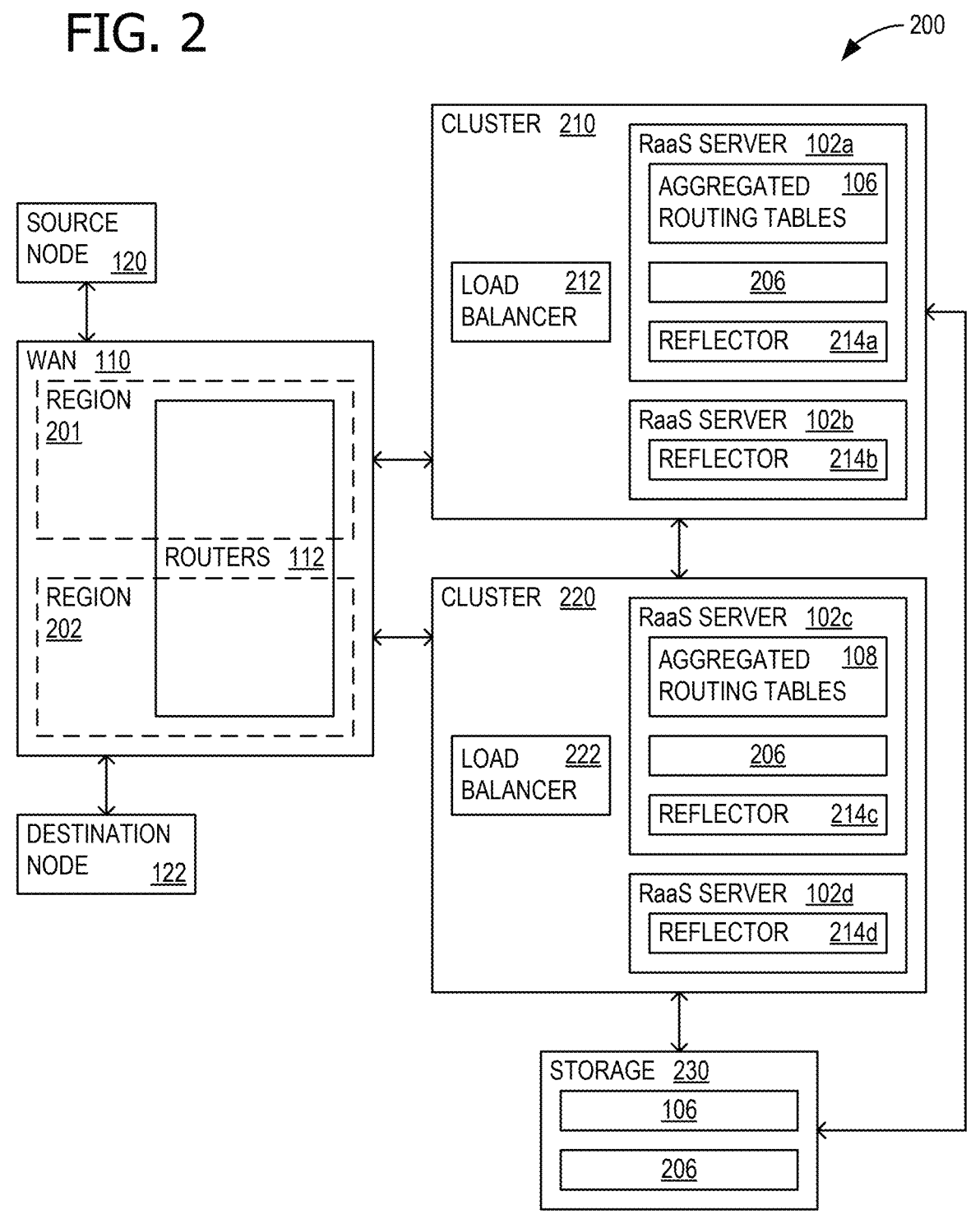

SOURCE NODE 120

WAN 110

REGION 201

ROUTERS 112

REGION 202

DESTINATION NODE 122

CLUSTER 210

LOAD BALANCER 212

RaaS SERVER 102a

AGGREGATED ROUTING TABLES 106

206

REFLECTOR 214a

RaaS SERVER 102b

REFLECTOR 214b

CLUSTER 220

LOAD BALANCER 222

RaaS SERVER 102c

AGGREGATED ROUTING TABLES 108

206

REFLECTOR 214c

RaaS SERVER 102d

REFLECTOR 214d

STORAGE 230

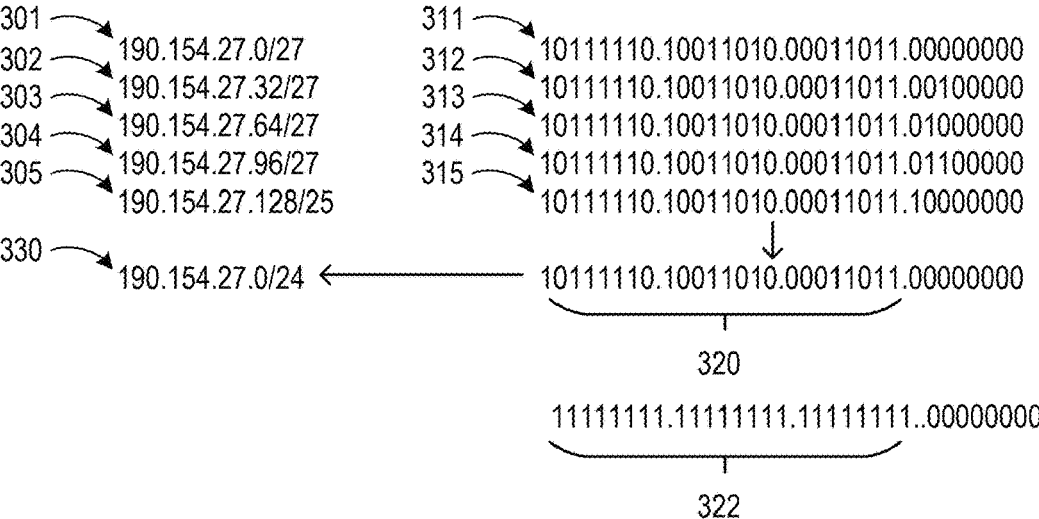

```
Let route_set be a PatriciaTrie with all routes to be aggregated                    400
Let aggregated be a PatriciaTrie with all the routes aggregated
Let flipBit(route) be a function that flips the last bit in route and returns the new route
Let aggregate(route, adj_route) be a function that aggregates the two prefixes and returns the
aggregated route Then:
aggregated <- route_set
changed <- true
while (changed) {
        changed <- false
        for each route in aggregated {
                adj_route <- flipBit(route)
                if (adj_route in aggregated) {
                        aggregated.Remove(adj_route)
                        aggregated.Remove(route)
                        new_route <- aggregate(route, adj_route)
                        aggregated.Add(new_route)
                        changed <- true
                        break
                }
        }
}
```

ROUTER
112a

RaaS SERVER
102a

TIME 502 (108)

Figure 7:
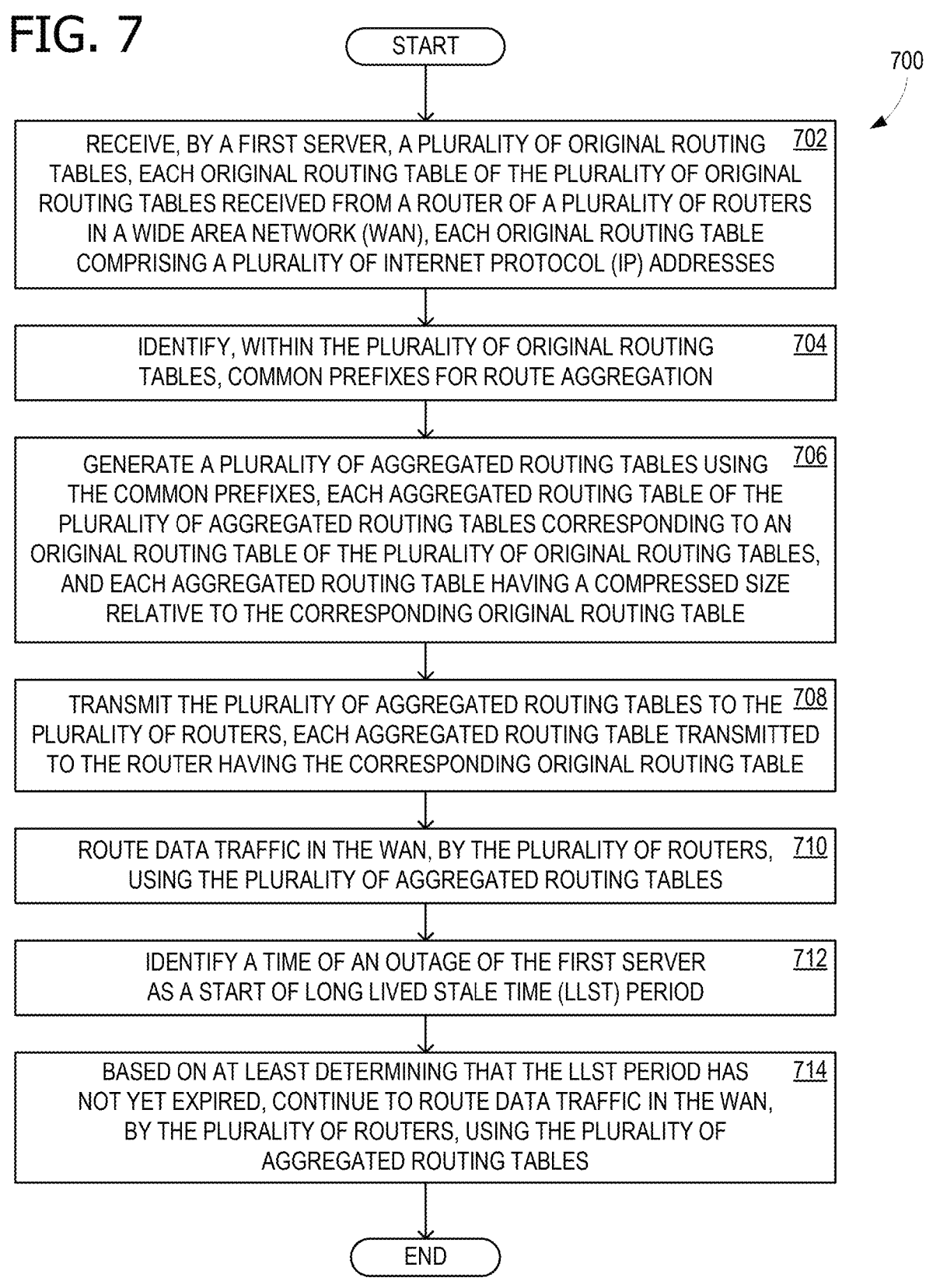

```
START
```

RECEIVE, BY A FIRST SERVER, A PLURALITY OF ORIGINAL ROUTING    702
TABLES, EACH ORIGINAL ROUTING TABLE OF THE PLURALITY OF ORIGINAL
ROUTING TABLES RECEIVED FROM A ROUTER OF A PLURALITY OF ROUTERS
IN A WIDE AREA NETWORK (WAN), EACH ORIGINAL ROUTING TABLE
COMPRISING A PLURALITY OF INTERNET PROTOCOL (IP) ADDRESSES

IDENTIFY, WITHIN THE PLURALITY OF ORIGINAL ROUTING    704
TABLES, COMMON PREFIXES FOR ROUTE AGGREGATION

GENERATE A PLURALITY OF AGGREGATED ROUTING TABLES USING    706
THE COMMON PREFIXES, EACH AGGREGATED ROUTING TABLE OF THE
PLURALITY OF AGGREGATED ROUTING TABLES CORRESPONDING TO AN
ORIGINAL ROUTING TABLE OF THE PLURALITY OF ORIGINAL ROUTING TABLES,
AND EACH AGGREGATED ROUTING TABLE HAVING A COMPRESSED SIZE
RELATIVE TO THE CORRESPONDING ORIGINAL ROUTING TABLE

TRANSMIT THE PLURALITY OF AGGREGATED ROUTING TABLES TO THE    708
PLURALITY OF ROUTERS, EACH AGGREGATED ROUTING TABLE TRANSMITTED
TO THE ROUTER HAVING THE CORRESPONDING ORIGINAL ROUTING TABLE

ROUTE DATA TRAFFIC IN THE WAN, BY THE PLURALITY OF ROUTERS,    710
USING THE PLURALITY OF AGGREGATED ROUTING TABLES

IDENTIFY A TIME OF AN OUTAGE OF THE FIRST SERVER    712
AS A START OF LONG LIVED STALE TIME (LLST) PERIOD

BASED ON AT LEAST DETERMINING THAT THE LLST PERIOD HAS    714
NOT YET EXPIRED, CONTINUE TO ROUTE DATA TRAFFIC IN THE WAN,
BY THE PLURALITY OF ROUTERS, USING THE PLURALITY OF
AGGREGATED ROUTING TABLES

```
END
```

Figure 8:
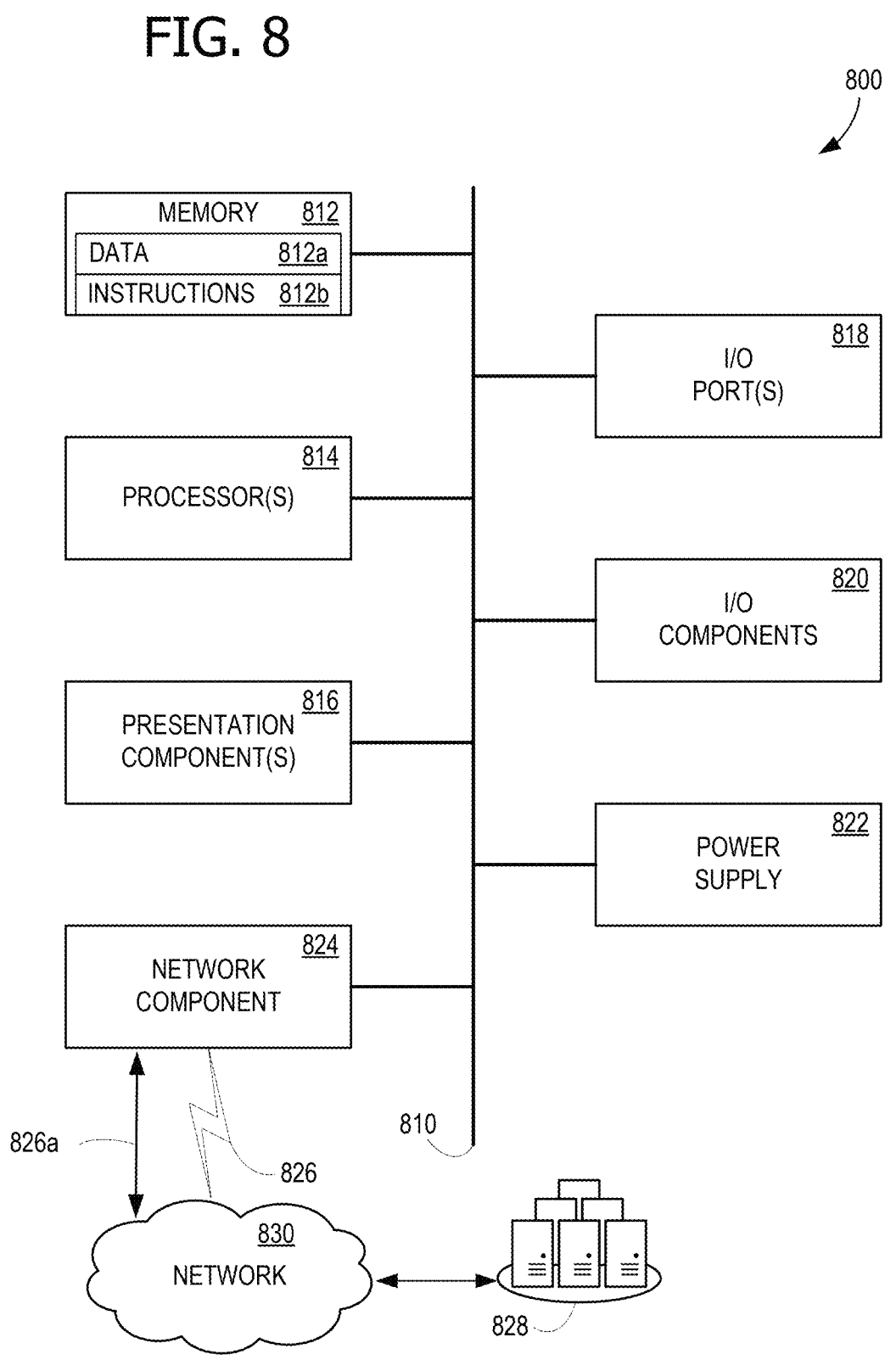

| MEMORY | 812 |
|---|---|
| DATA | 812a |
| INSTRUCTIONS | 812b |

| 814 |
|---|
| PROCESSOR(S) |

| PRESENTATION | 816 |
|---|---|
| COMPONENT(S) | |

| NETWORK | 824 |
|---|---|
| COMPONENT | |

| I/O | 818 |
|---|---|
| PORT(S) | |

| I/O | 820 |
|---|---|
| COMPONENTS | |

| POWER | 822 |
|---|---|
| SUPPLY | |

810

826a

826

830
NETWORK

828

ROUTE AGGREGATION AS A SERVICE (RaaS)

BACKGROUND

Route aggregation (a.k.a. route summarization) is used to combine a set of more specific routes into generic aggregated routes, such as for internet protocol (IP) addresses (both IPv4 and IPv6) used by routers in a wide area network (WAN). This reduces the number of routes advertised by a given protocol, minimizing the size of routing tables in the routers, by advertising multiple contiguous or sequential routes from the routing table in the form of summarized or aggregated routes. Reducing routing table size in large networks is able to not only reduce memory usage in the routers but it also improves convergence and reduces look-up time (with fewer addresses to search)

Unfortunately, manual route aggregation, by humans, requires the development of a closed loop system in which any changes to static data needs to be applied on the devices on the network. This is labor intensive and error prone and therefore likely to cause outages. Per-device dynamic route aggregation lacks a mechanism to ensure consistency and is this prone to causing unwanted significant traffic shifts. The resulting traffic skewing produces unnecessary localized congestion that could cause traffic delays and packet drops. The manual aggregation process does not consider the dynamic state of the network, and thus has a potential to cause holes in aggregated addresses.

SUMMARY

The disclosed examples are described in detail below with reference to the accompanying drawing figures listed below. The following summary is provided to illustrate some examples disclosed herein.

Example solutions for providing route aggregation as a service (RaaS): receive, by a first server, a plurality of original routing tables, each original routing table of the plurality of original routing tables received from a router of a plurality of routers in a wide area network (WAN), each original routing table comprising a plurality of internet protocol (IP) addresses; identify, within the plurality of original routing tables, common prefixes for route aggregation; generate a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table; transmit the plurality of aggregated routing tables to the plurality of routers, each aggregated routing table transmitted to the router having the corresponding original routing table; route data traffic in the WAN, by the plurality of routers, using the plurality of aggregated routing tables; identify a time of an outage of the first server as a start of a long lived stale time (LLST) period; and based on at least determining that the LLST period has not yet expired, continue to route data traffic in the WAN, by the plurality of routers, using the plurality of aggregated routing tables.

BRIEF DESCRIPTION OF THE DRAWINGS

The disclosed examples are described in detail below with reference to the accompanying drawing figures listed below:

FIG. 1 illustrates an exemplary architecture that advantageously provides route aggregation as a service (RaaS);

FIG. 2 illustrates an exemplary extension of the architecture of FIG. 1 to a network with multiple regions;

FIG. 3 illustrates route aggregation, as may be performed using examples of the architecture of FIG. 1;

FIG. 4 illustrates exemplary pseudo-code for route aggregation, as may be used in examples of the architecture of FIG. 1;

FIG. 5 illustrates an exemplary message sequence diagram of messages that may be used in examples of the architectures of FIGS. 1-4;

FIGS. 6 and 7 show flowcharts illustrating exemplary operations that may be performed when using example architectures, such as any of the architectures of FIGS. 1 and 2; and FIG. 8 shows a block diagram of an example computing device suitable for implementing some of the various examples disclosed herein.

Corresponding reference characters indicate corresponding parts throughout the drawings.

DETAILED DESCRIPTION

Figure 6:
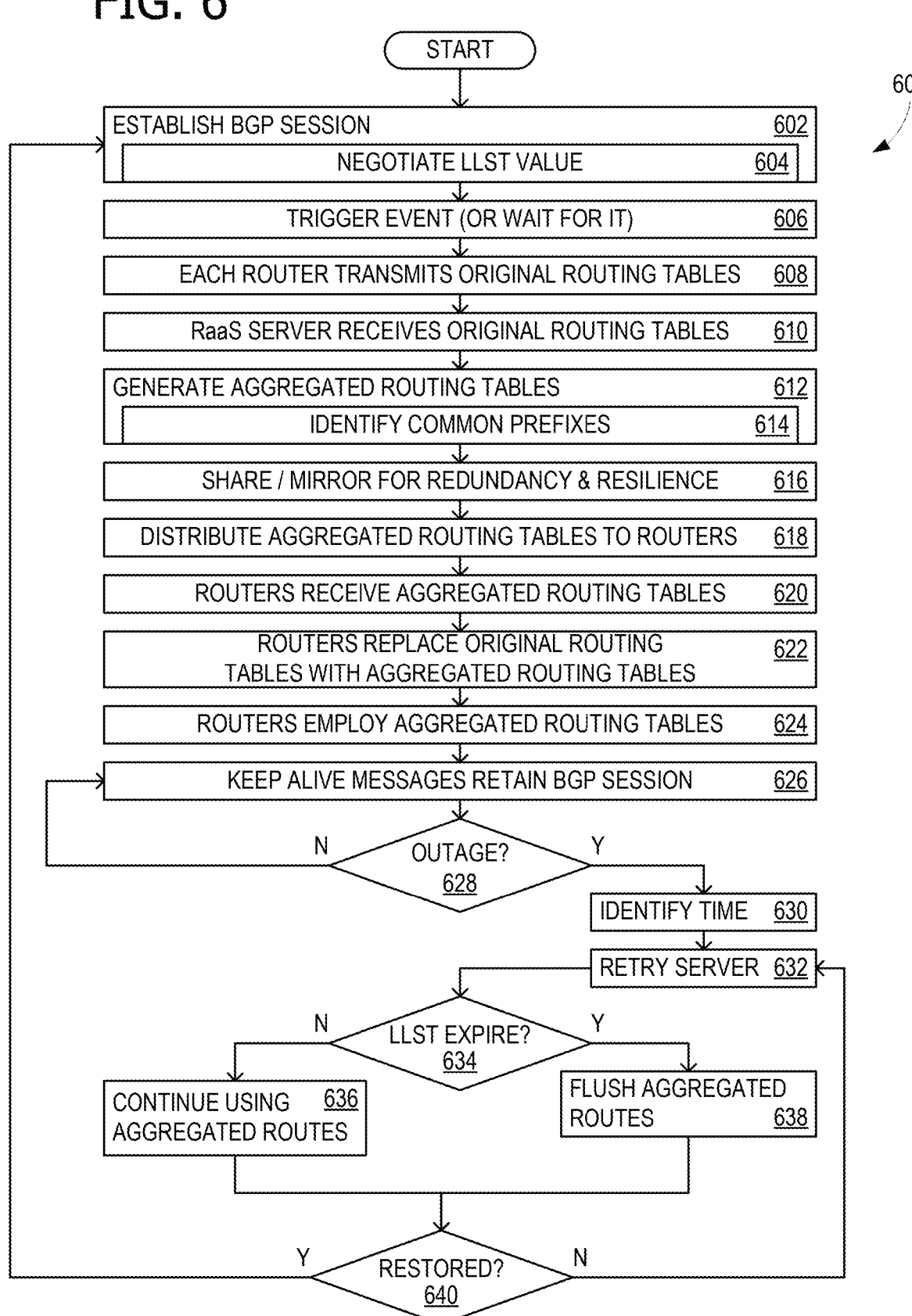

Example solutions for providing route aggregation as a service (RaaS) are disclosed. A RaaS server receives original routing tables from routers in a wide area network (WAN), aggregates the routes by identifying contiguous address spaces, and returns more compact aggregated routing tables to the routers. The routers use the aggregated routing tables to efficiently route data traffic in the WAN. Multiple resiliency approaches are disclosed, in order to prevent the routers from flushing the aggregated routes in the event that the RaaS server experiences an outage or the border gateway protocol (BGP) session between each router and the RaaS server is lost. Example resiliency measures includes the use of a long lived stale time (LLST), reaching a length of perhaps weeks, during which the routers continue to use the aggregated routing tables, and the use of mirroring the aggregated routing tables in other RaaS servers.

Aspects of the disclosure solve multiple problems that are necessarily rooted in computer technology, such as compressing routing tables in routers used in and with a WAN in a highly-resilient manner, enabling faster convergence, reduced look-up time, and operation using routers requiring less memory (i.e., less expensive routers). This is accomplished, at least in part by, generating a plurality of aggregated routing tables using contiguous prefix blocks, transmitting the plurality of aggregated routing tables to a plurality of routers, and based on at least determining that an LLST period has not yet expired, continuing to route data traffic in the WAN, by the plurality of routers, using the plurality of aggregated routing tables.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
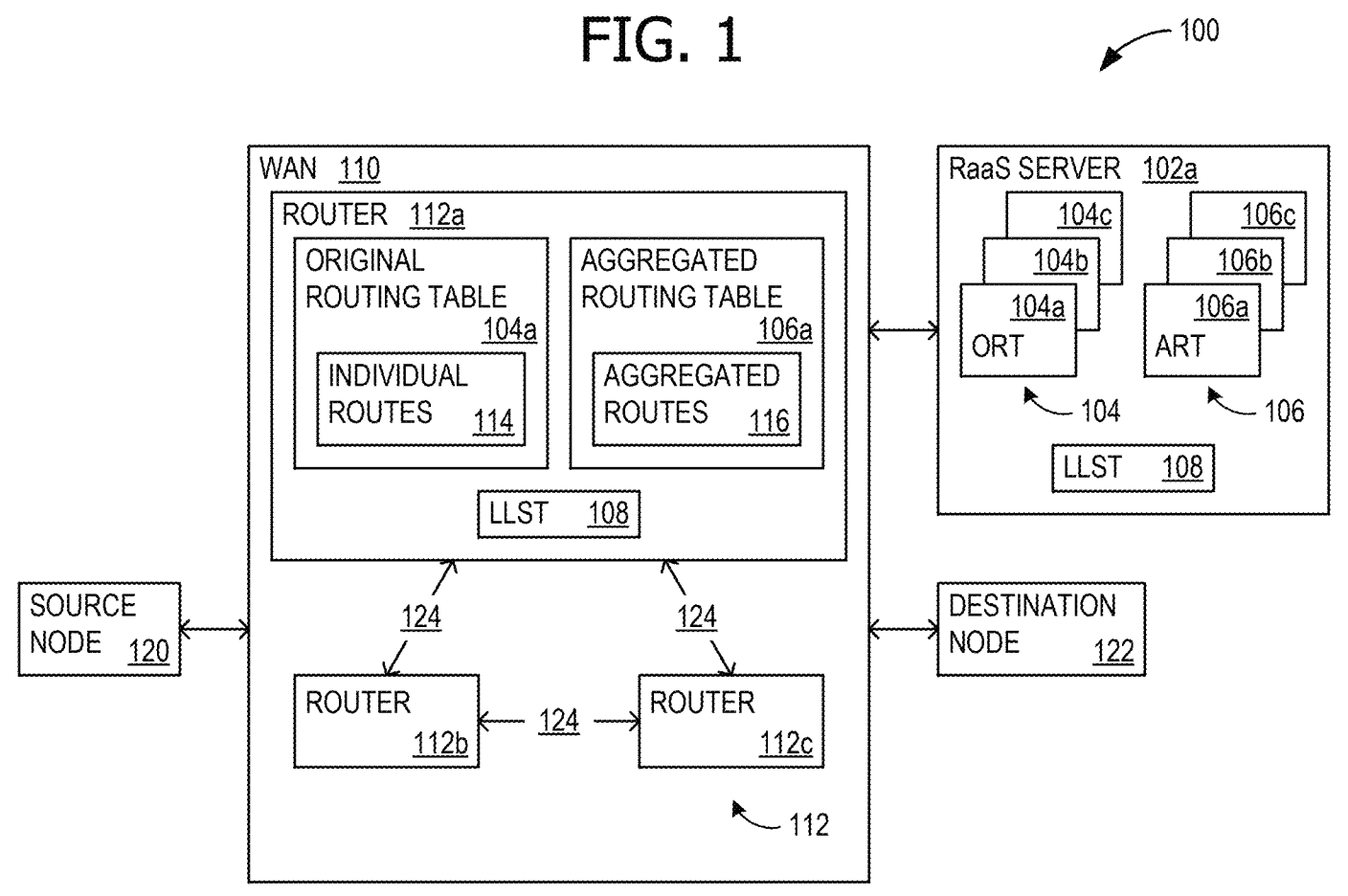

FIG. 1 illustrates an example architecture 100 that advantageously provides RaaS to a large network, such as a WAN 110. A source node 120 and a destination node 122 use WAN 110 to exchange data traffic, which is included in data traffic 124 that is routed among a plurality of routers 112. Plurality of routers 112 includes a router 112a, a router 112b, and a router 112c, although it should be understood that some examples may use a larger number of routers, numbering in the tens or hundreds of thousands.

RaaS server 102a receives a plurality of original routing tables 104 from plurality of routers 112, such as an original routing table 104a from router 112a, an original routing table 104b from router 112b, and an original routing table 104c from router 112c. RaaS server 102a aggregates the routes that can be aggregated, such as is shown in FIGS. 3, 4, and 6 and described below, to generate a plurality of aggregated routing tables 106. RaaS server 102a transmits the aggregated routing tables of plurality of aggregated routing tables 106 to the proper router, such as transmitting an aggregated routing table 106a to router 112a, an aggregated routing table 106b to router 112b, and an aggregated routing table 106c to router 112c.

In this scheme, aggregated routing table 106a corresponds to original routing table 104a, aggregated routing table 106b corresponds to original routing table 104b, and aggregated routing table 106c corresponds to original routing table 104c, because original routing table 104a was received from router 112a and aggregated routing table 106a is transmitted to router 112a, original routing table 104b was received from router 112b and aggregated routing table 106b is transmitted to router 112b, and original routing table 104c was received from router 112c and aggregated routing table 106c is transmitted to router 112c. Although RaaS server 102a is described herein as a RaaS server, it should be understood that another generic server (or other computing apparatus) may provide the functionality described herein for any element described herein as a RaaS server.

Router 112a is shown as having original routing table 104a (initially) with individual routes 114, and then original routing table 104a is replaced with aggregated routing table 106a, that has aggregated routes 116. Individual routes 114 and aggregated routes 116 may be IP addresses, as shown in FIG. 3. Additionally, LLST 108 is configured on the router as part of the BGP configuration of plurality of routers 112, which includes router 112a. LLST 108 is used by each of plurality of routers 112 as a resiliency measure, to continue using plurality of aggregated routing tables 106 during a time period defined by LLST 108 in the event that BGP sessions go down completely within a cluster. (See FIG. 2.) LLST is activated at a per cluster level. If a BGP session with another cluster remains intact, routers will use aggregated routes from that active BGP session. Without LLST 108, if the BGP sessions with all clusters are lost, the routers' default functionality may be to flush the aggregated routes. LLST 108 may be on the order of days or weeks, in some examples.

FIG. 2 illustrates an extension of architecture 100 to an architecture 200 in which WAN 110 has multiple regions, such as geographic regions (although WAN 110 may also be segmented by data type or sensitivity, in some examples). In further mentions of architecture 200 below, it should be understood that architecture 200 may be used instead. In the example of architecture 200, plurality of routers 112 of WAN 110 is spread among a region 201 and a region 202, although it should be understood that some examples of architecture 200 may use a different number of regions.

Region 201 receives RaaS from a cluster 210 that has RaaS server 102a, a RaaS server 102b, and a load balancer 212. Region 202 similarly receives RaaS from a cluster 220 that has a RaaS server 102c, a RaaS server 102d, and a load balancer 222. Some examples have three RaaS servers per cluster. One RaaS server per cluster acts as a primary and has the routing tables. If that RaaS server goes down, another RaaS server is populated with the necessary routing tables and takes over. If all RaaS servers in a cluster go down, routers may still have connectivity with another cluster. Only when all RaaS servers in all clusters go down, and no RaaS servers can be reached with a BGP session, do the routers then use the LLST (e.g., LLST 108).

In the illustrated example, load balancer 212 has selected RaaS server 102a and RaaS server 102b provide redundancy. Because RaaS server 102a is acting as primary, it is populated with routing tables, such as plurality of aggregated routing tables 106, and also a plurality of aggregated routing tables 206 for routers within region 202 (to act as a backup for region 202 in the event that all RaaS servers in region 202 go down). RaaS server 102b is not yet populated with routing tables.

Load balancer 222 has selected RaaS server 102c to act as a primary and RaaS server 202d to act as a backup. Because RaaS server 102c is acting as primary, it is populated with routing tables, such as plurality of aggregated routing tables 206, and also plurality of aggregated routing tables 106 for routers within region 201 (to act as a backup for region 201 in the event that all RaaS servers in region 201 go down). RaaS server 102d is not yet populated with routing tables.

RaaS server 102a has a reflector 214a, RaaS server 102b has a reflector 214b, RaaS server 102c has a reflector 214c, and RaaS server 102d has a reflector 214d. Reflectors 214a-214d ensure that aggregated routes are sent back to the corresponding routers, and also a storage 230, that provides further resiliency.

FIG. 3 illustrates route aggregation, as may be performed using examples of architecture 100. A set of five exemplary (sequential) IP address are shown, an IP address 301 having a value of 190.154.27.0, an IP address 302 having a value of 190.154.27.32, an IP address 303 having a value of 190.154.27.64, an IP address 304 having a value of 190.154.27.96, and an IP address 303 having a value of 190.154.27.128. These are, respectively an IP address binary value 311 of 10111110 10011010 00011011 00000000, an IP address binary value 312 of 10111110 10011010 00011011 00100000, an IP address binary value 313 of 10111110 10011010 00011011 01000000, an IP address binary value 314 of 10111110 10011010 00011011 01100000, and an IP address binary value 315 of 10111110 10011010 00011011 10000000. A binary mask 322 of 11111111 11111111 11111111 00000000 has values of 1 for each bit of a common prefix 320 of 10111110 10011010 00011011 (which is 24 bits), producing an aggregated route IP address 330 of 190.154.27.0/24.

FIG. 4 illustrates an exemplary pseudo-code passage 400 for aggregation that asymptotically approaches O(N*N), where N is the number of IP addresses aggregated. This may be optimized further by using a Trie data structure to calculate the aggregates.

Figure 5:
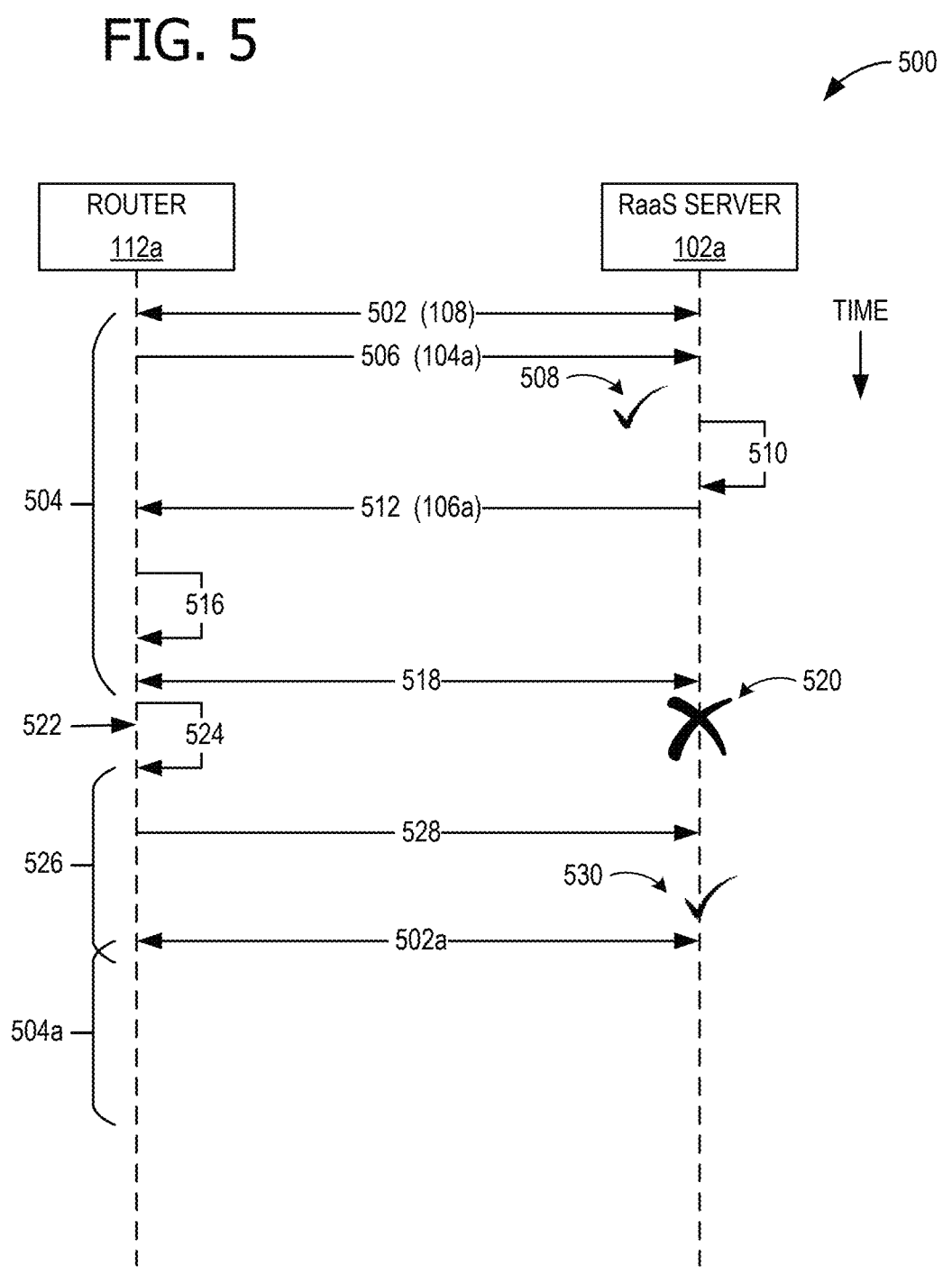

FIG. 5 illustrates an exemplary message sequence diagram 500 of messages that may be used in examples of any of architectures 100 and 200, and FIG. 6 shows a flowchart 600 illustrating exemplary operations that may be performed by architecture 100 or 200. In some examples, operations described for flowchart 600 are performed by computing device 800 of FIG. 8. Flowchart 600 and message sequence diagram 500 are described together.

Flowchart 600 commences with establishing a BGP session between each router of plurality of routers 112 and RaaS server 102a, in operation 602, such as using messages 502 to establish a BGP session 504 between router 112a and RaaS server 102a. In some examples, RaaS server 102a and plurality of routers 112 exchange messages using BGP, although another protocol may be used in some examples.

LLST 108 is negotiated during the establishment of BGP session 504, using messages 502, in operation 604.

A trigger event 508 occurs in operation 606, such as a timer event (e.g., a repeating timer event), RaaS server 102a recovering from outage, and/or a router experiencing an outage. Each router of plurality of routers 112 transmits its original routing table to RaaS server 102a using BGP in operation 608. As shown, router 112a transmits its original routing table 104a to RaaS server 102a using a message 506. RaaS server 102a receives plurality of original routing tables 104 from plurality of routers 112 (each original routing table received from a router in WAN 110, and comprising a plurality of IP addresses) in operation 608. Trigger event 508 may occur prior to or after operations 608 and 610, and if after, RaaS server 102a accumulates original routing tables until trigger event 508 triggers generation of plurality of aggregated routing tables 106. In some examples, no trigger event is used, and aggregation is an ongoing, uninterrupted process.

In operation 612, RaaS server 102a generates plurality of aggregated routing tables 106 using common prefixes 322. This is also shown as message 510 in FIG. 5. Each aggregated routing table of plurality of aggregated routing tables 106 corresponds to an original routing table of plurality of original routing tables 104, and each aggregated routing table has a compressed size relative to its corresponding original routing table. In some examples, this comprises combining sequential IP addresses, and/or applying defined policies to drop routes or to add static routes. Operation 612 includes operation 614, in which RaaS server 102a identifies common prefixes 322 for route aggregation within plurality of original routing tables 104.

RaaS server 102a shares plurality of aggregated routing tables 106 with RaaS server 102c in operation 616 for redundancy, to enhance resiliency. In exchange, RaaS server 102a receives plurality of aggregated routing tables 208 from region 202 of WAN 110.

In operation 618, RaaS server 102a transmits plurality of aggregated routing tables 106 to plurality of routers 112 (e.g., using BGP), each aggregated routing table transmitted to the router having the corresponding original routing table. For example message 512 is used to transmit aggregated routing table 106a to router 112a. Based on at least receiving its aggregated routing table, router 112a replaces original routing table 104a with aggregated routing table 106a, in operation 622. This is shown as message 516. Other routers perform similarly.

In operation 624, plurality of routers 112 route data traffic 124 in WAN 110, using plurality of aggregated routing tables 106. In operation 626, plurality of routers 112 each uses keep alive messages with RaaS server 102a to alert each router of plurality of routers 112 that RaaS server 102a has not experienced an outage, to retain BGP session 504 alive. Keep alive messages 518 are shown between router 112a and RaaS server 102a. Decision operation 628 determines whether RaaS server 102a has experienced an outage. If not, flowchart 600 returns to operation 626. When an outage 520 occurs, router 112a identifies a time 522 of outage 520 of RaaS server 102a as a start of an LLST period 526, in operation 630. In some examples, this is performed by identifying a cessation of keep alive messages 518 received from RaaS server 102a, which is shown as message 524.

During outage 520 of RaaS server 102a, as an ongoing operation 632 (until successful or otherwise terminated), router 112a attempts to reestablish communication with RaaS server 102a using messages 528. Also during outage

520, decision operation 634 periodically determines whether LLST period 526 has expired. If not, based on at least determining that LLST period 528 has not yet expired, plurality of routers 112 continue to route data traffic 124 in WAN 110 using plurality of aggregated routing tables 106 in operation 636. If, however, LLST period 526 does expire, based on at least determining that the LLST period 526 has expired, router 112a flushes aggregated routes 116 of aggregated routing table 106a in operation 638. Router 112a then returns to building a new routing table and using newly-determined individual routes 114, operating without RaaS.

Decision operation 640 determines whether RaaS server 102a is restored to operation in a recovery 530. If not, flowchart 600 returns to operation 632, and cycles until recovery 530. When decision operation 640 determines whether RaaS server 102a is restored to operation, flowchart 600 returns to operation 602 to establish a new BGP session 504a using messages 502a.

In the next pass through flowchart 600, operation 604 is now refreshing plurality of aggregated routing tables 106, based on at least trigger event 508. Operations 606-626 now: receiving, by RaaS server 102a, a second plurality of original routing tables (operation 608); identify common prefixes 322 for route aggregation (operation 610); generate plurality of aggregated routing tables 206 using common prefixes 322 (operation 612); and transmit plurality of aggregated routing tables 206 to plurality of routers 112 (operation 616).

FIG. 7 shows a flowchart 700 illustrating exemplary operations that may be performed by any of architectures 100 and 200. In some examples, operations described for flowchart 700 are performed by computing device 800 of FIG. 8. Flowchart 700 commences with operation 702, which includes receiving, by a first server, a plurality of original routing tables, each original routing table of the plurality of original routing tables received from a router of a plurality of routers in a WAN, with each original routing table comprising a plurality of IP addresses.

Operation 704 includes identifying, within the plurality of original routing tables, common prefixes for route aggregation. Operation 706 includes generating a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table. Operation 708 includes transmitting the plurality of aggregated routing tables to the plurality of routers, each aggregated routing table transmitted to the router having the corresponding original routing table.

Operation 710 includes routing data traffic in the WAN, by the plurality of routers, using the plurality of aggregated routing tables. Operation 712 includes identifying a time of an outage of the first server as a start of an LLST period. Operation 714 includes, based on at least determining that the LLST period has not yet expired, continuing to route data traffic in the WAN, by the plurality of routers, using the plurality of aggregated routing tables.

ADDITIONAL EXAMPLES

An example system comprises: a processor; and a computer-readable medium storing instructions that are operative upon execution by the processor to: receive, by a first server, a plurality of original routing tables, each original routing table of the plurality of original routing tables received from a router of a plurality of routers in a WAN, each original routing table comprising a plurality of IP addresses; identify, within the plurality of original routing tables, common prefixes for route aggregation; generate a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table; transmit the plurality of aggregated routing tables to the plurality of routers, each aggregated routing table transmitted to the router having the corresponding original routing table; route data traffic in the WAN, by the plurality of routers, using the plurality of aggregated routing tables; identify a time of an outage of the first server as a start of an LLST period; and based on at least determining that the LLST period has not yet expired, continue to route data traffic in the WAN, by the plurality of routers, using the plurality of aggregated routing tables.

An example computer-implemented method comprises: receiving, by a first server, a plurality of original routing tables, each original routing table of the plurality of original routing tables received from a router of a plurality of routers in a WAN, each original routing table comprising a plurality of IP addresses; identifying, within the plurality of original routing tables, common prefixes for route aggregation; generating a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table; transmitting the plurality of aggregated routing tables to the plurality of routers, each aggregated routing table transmitted to the router having the corresponding original routing table; routing data traffic in the WAN, by the plurality of routers, using the plurality of aggregated routing tables; identifying a time of an outage of the first server as a start of an LLST period; and based on at least determining that the LLST period has not yet expired, continuing to route data traffic in the WAN, by the plurality of routers, using the plurality of aggregated routing tables.

One or more example computer storage devices have computer-executable instructions stored thereon, which, on execution by a computer, cause the computer to perform operations comprising: receiving, by a first server, a plurality of original routing tables, each original routing table of the plurality of original routing tables received from a router of a plurality of routers in a WAN, each original routing table comprising a plurality of IP addresses; identifying, within the plurality of original routing tables, common prefixes for route aggregation; generating a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table; transmitting the plurality of aggregated routing tables to the plurality of routers, each aggregated routing table transmitted to the router having the corresponding original routing table; routing data traffic in the WAN, by the plurality of routers, using the plurality of aggregated routing tables; identifying a time of an outage of the first server as a start of an LLST period; and based on at least determining that the LLST period has not yet expired, continuing to route data traffic in the WAN, by the plurality of routers, using the plurality of aggregated routing tables.

Alternatively, or in addition to the other examples described herein, examples include any combination of the following:

based on at least receiving an aggregated routing table, replacing, by a router of the plurality of routers, the original routing table of the router with the aggregated routing table;

based on at least determining that the LLST period has expired, flushing, by the router of the plurality of routers, aggregated routes of the aggregated routing table;

using keep alive messages to alert each router of the plurality of routers that the first server has not experienced an outage;

identifying the time of the outage of the first server comprises identifying a cessation of keep alive message from the first server;

based on at least a trigger event, refreshing the plurality of aggregated routing tables;

refreshing the plurality of aggregated routing tables comprises: receiving, by the first server, a second plurality of original routing tables, each original routing table of the second plurality of original routing tables received from a router of the plurality of routers in the WAN; identifying common prefixes for route aggregation; generating a second plurality of aggregated routing tables using the common prefixes; and transmitting the second plurality of aggregated routing tables to the plurality of routers;

the trigger event comprises at least one event selected from the list consisting of: a timer event, the first server recovering from the outage, and a router experiencing an outage;

sharing, by the first server, with a second server, a third server, and a fourth server, the plurality of aggregated routing tables;

the first server, the second server, the third server, and the fourth server each comprises a RaaS server;

the first server and the second server are within a first region of the WAN;

the third server and the fourth server are within a second region of the WAN; and the first server and the second server each receive a third plurality of aggregated routing tables from the second region of the WAN;

establishing a BGP session between each router of the plurality of routers and the first server;

the first server and the plurality of routers exchange messages using BGP;

generating the plurality of aggregated routing tables comprises combining sequential IP addresses;

the LLST is longer than a week;

the trigger event comprises a repeating timer event; and during the outage of the first server, attempting, by the router of the plurality of routers, to reestablish communication with the first server.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 (e.g., a computer storage device) for implementing aspects disclosed herein, and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set.

Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more buses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812*a* and instructions 812*b* that are executable by processor 814 and configured to carry out the various operations disclosed herein. Thus, computing device 800 comprises a computer storage device having computer-executable instructions 812*b* stored thereon.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer storage memory," "memory," and "memory devices" are synonymous terms for the memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represents an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826*a* to a remote resource 828 (e.g., a cloud resource) across network 830. Various different examples of communication links 826 and 826*a* include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
     receive, by a first server, a plurality of original routing tables, each original routing table of the plurality of original routing tables received from a router of a plurality of routers in a wide area network (WAN), each original routing table comprising a plurality of internet protocol (IP) addresses;
     identify, within the plurality of original routing tables, common prefixes for route aggregation;
     generate a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table;
     transmit the plurality of aggregated routing tables to the plurality of routers, each aggregated routing table transmitted to the router having the corresponding original routing table;
     route data traffic in the WAN, by the plurality of routers, using the plurality of aggregated routing tables;
     identify a time of an outage of the first server as a start of a long lived stale time (LLST) period; and
     based on at least determining that the LLST period has not yet expired, continue to route data traffic in the WAN, by the plurality of routers, using the plurality of aggregated routing tables.

2. The system of claim 1, wherein the instructions are further operative to:

based on at least receiving an aggregated routing table, replace, by a router of the plurality of routers, the original routing table of the router with the aggregated routing table.

3. The system of claim 2, wherein the instructions are further operative to:

based on at least determining that the LLST period has expired, flush, by the router of the plurality of routers, aggregated routes of the aggregated routing table.

4. The system of claim 1, wherein the instructions are further operative to:

use keep alive messages to alert each router of the plurality of routers that the first server has not experienced an outage, wherein identifying the time of the outage of the first server comprises:

identifying a cessation of keep alive message from the first server.

5. The system of claim 1, wherein the instructions are further operative to:

based on at least a trigger event, refresh the plurality of aggregated routing tables, wherein refreshing the plurality of aggregated routing tables comprises:

receiving, by the first server, a second plurality of original routing tables, each original routing table of the second plurality of original routing tables received from a router of the plurality of routers in the WAN;

identifying common prefixes for route aggregation;

generating a second plurality of aggregated routing tables using the common prefixes; and transmitting the second plurality of aggregated routing tables to the plurality of routers.

6. The system of claim 5, wherein the trigger event comprises at least one event selected from the list consisting of:

a timer event, the first server recovering from the outage, and a router experiencing an outage.

7. The system of claim 1, wherein the instructions are further operative to:

share, by the first server, with a second server, a third server, and a fourth server, the plurality of aggregated routing tables;

wherein the first server, the second server, the third server, and the fourth server each comprises a route aggregation as a service (RaaS) server;

wherein the first server and the second server are within a first region of the WAN;

wherein the third server and the fourth server are within a second region of the WAN; and wherein the first server and the second server each receive a third plurality of aggregated routing tables from the second region of the WAN.

8. A computer-implemented method comprising:

receiving, by a first server, a plurality of original routing tables, each original routing table of the plurality of original routing tables received from a router of a plurality of routers in a wide area network (WAN), each original routing table comprising a plurality of internet protocol (IP) addresses;

identifying, within the plurality of original routing tables, common prefixes for route aggregation;

generating a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table;

transmitting the plurality of aggregated routing tables to the plurality of routers, each aggregated routing table transmitted to the router having the corresponding original routing table;

routing data traffic in the WAN, by the plurality of routers, using the plurality of aggregated routing tables;

identifying a time of an outage of the first server as a start of a long lived stale time (LLST) period; and based on at least determining that the LLST period has not yet expired, continuing to route data traffic in the WAN, by the plurality of routers, using the plurality of aggregated routing tables.

9. The method of claim 8, further comprising:

based on at least receiving an aggregated routing table, replacing, by a router of the plurality of routers, the original routing table of the router with the aggregated routing table.

10. The method of claim 9, further comprising:

based on at least determining that the LLST period has expired, flushing, by the router of the plurality of routers, aggregated routes of the aggregated routing table.

11. The method of claim 8, further comprising:

using keep alive messages to alert each router of the plurality of routers that the first server has not experienced an outage, wherein identifying the time of the outage of the first server comprises:

identifying a cessation of keep alive message from the first server.

12. The method of claim 8, further comprising:

based on at least a trigger event, refreshing the plurality of aggregated routing tables, wherein refreshing the plurality of aggregated routing tables comprises:

receiving, by the first server, a second plurality of original routing tables, each original routing table of the second plurality of original routing tables received from a router of the plurality of routers in the WAN;

identifying common prefixes for route aggregation;

generating a second plurality of aggregated routing tables using the common prefixes; and transmitting the second plurality of aggregated routing tables to the plurality of routers.

13. The method of claim 12, wherein the trigger event comprises at least one event selected from the list consisting of:

a timer event, the first server recovering from the outage, and a router experiencing an outage.

14. The method of claim 8, further comprising:

sharing, by the first server, with a second server, a third server, and a fourth server, the plurality of aggregated routing tables;

wherein the first server, the second server, the third server, and the fourth server each comprises a route aggregation as a service (RaaS) server;

wherein the first server and the second server are within a first region of the WAN;

wherein the third server and the fourth server are within a second region of the WAN; and wherein the first server and the second server each receive a third plurality of aggregated routing tables from the second region of the WAN.

15. A computer storage device having computer-executable instructions stored thereon, which, on execution by a computer, cause the computer to perform operations comprising:

receiving, by a first server, a plurality of original routing tables, each original routing table of the plurality of original routing tables received from a router of a plurality of routers in a wide area network (WAN), each original routing table comprising a plurality of internet protocol (IP) addresses;

identifying, within the plurality of original routing tables, common prefixes for route aggregation;

generating a plurality of aggregated routing tables using the common prefixes, each aggregated routing table of the plurality of aggregated routing tables corresponding to an original routing table of the plurality of original routing tables, and each aggregated routing table having a compressed size relative to the corresponding original routing table;

transmitting the plurality of aggregated routing tables to the plurality of routers, each aggregated routing table transmitted to the router having the corresponding original routing table;

routing data traffic in the WAN, by the plurality of routers, using the plurality of aggregated routing tables;

identifying a time of an outage of the first server as a start of a long lived stale time (LLST); and based on at least determining that the LLST period has not yet expired, continuing to route data traffic in the WAN, by the plurality of routers, using the plurality of aggregated routing tables.

16. The computer storage device of claim 15, wherein the operations further comprise:

based on at least receiving an aggregated routing table, replacing, by a router of the plurality of routers, the original routing table of the router with the aggregated routing table.

17. The computer storage device of claim 16, wherein the operations further comprise:

based on at least determining that the LLST period has expired, flushing, by the router of the plurality of routers, aggregated routes of the aggregated routing table.

18. The computer storage device of claim 15, wherein the operations further comprise:

using keep alive messages to alert each router of the plurality of routers that the first server has not experienced an outage, wherein identifying the time of the outage of the first server comprises:

identifying a cessation of keep alive message from the first server.

19. The computer storage device of claim 15, wherein the operations further comprise:

based on at least a trigger event, refreshing the plurality of aggregated routing tables, wherein refreshing the plurality of aggregated routing tables comprises:

receiving, by the first server, a second plurality of original routing tables, each original routing table of the second plurality of original routing tables received from a router of the plurality of routers in the WAN;

identifying common prefixes for route aggregation;

generating a second plurality of aggregated routing tables using the common prefixes; and transmitting the second plurality of aggregated routing tables to the plurality of routers.

20. The computer storage device of claim 15, wherein the operations further comprise:

sharing, by the first server, with a second server, a third server, and a fourth server, the plurality of aggregated routing tables;

wherein the first server, the second server, the third server, and the fourth server each comprises a route aggregation as a service (RaaS) server;

wherein the first server and the second server are within a first region of the WAN;

wherein the third server and the fourth server are within a second region of the WAN; and wherein the first server and the second server each receive a third plurality of aggregated routing tables from the second region of the WAN.

* * * * *